Aug. 11, 1931.  H. C. ELLIOTT  1,817,976
MOTOR VEHICLE
Filed April 29, 1927
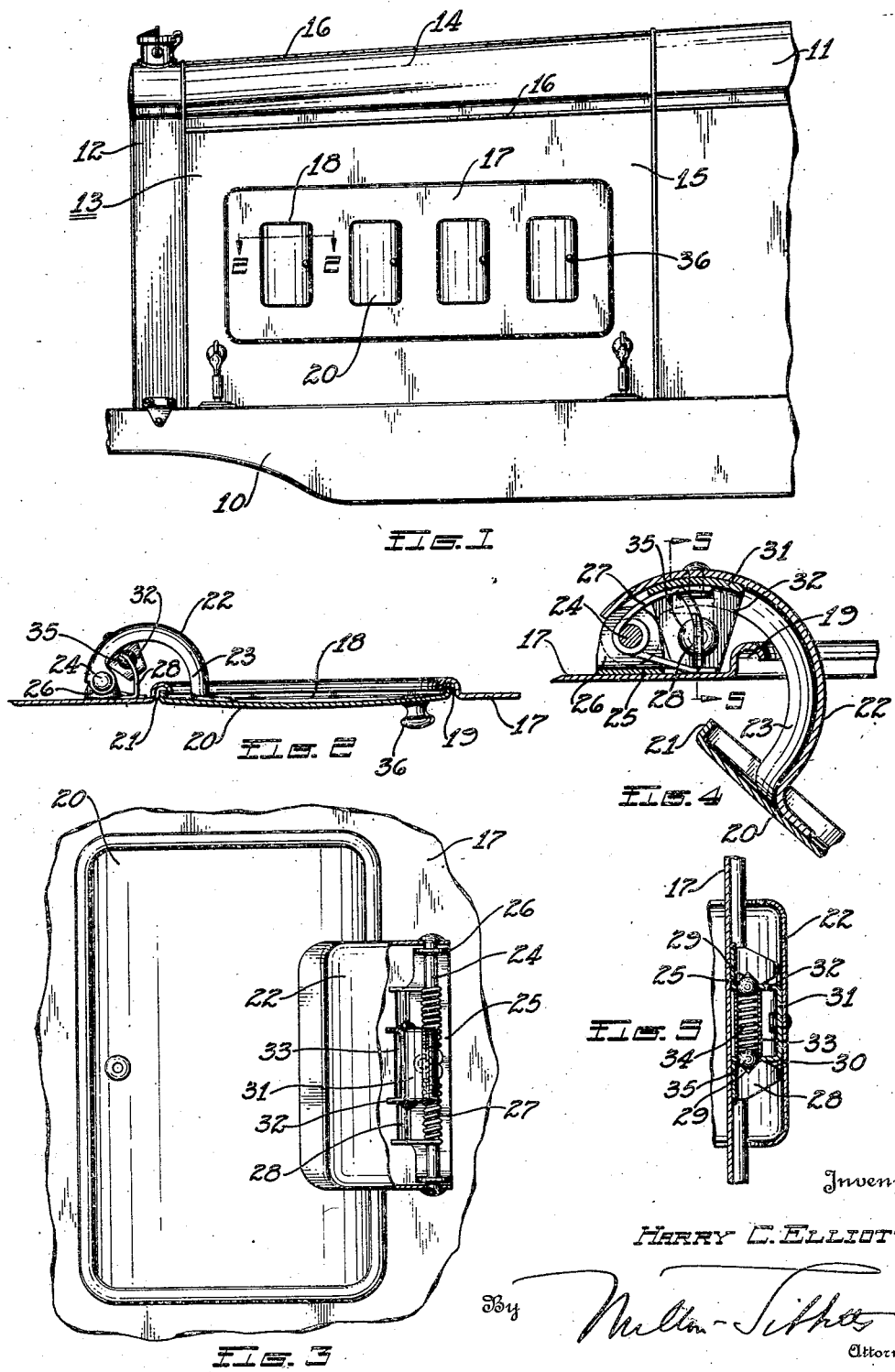
Inventor
HARRY C. ELLIOTT.
By Miller Sibbet
Attorney Patented Aug. 11, 1931

1,817,976

UNITED STATES PATENT OFFICE

HARRY C. ELLIOTT, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed April 29, 1927. Serial No. 187,439.

This invention relates to a motor vehicle and more particularly to the bonnet construction thereof.

An object of the invention is to provide a ventilator for the engine bonnet of a motor vehicle, having means for opening and closing to effectively control the circulation of air through the engine compartment.

Another object of the invention is to provide a ventilator having a cover or door for closing and opening, the door being arranged to seal the opening against the passages of air through the ventilator.

Another object of the invention is to provide a ventilator having a cover or door adapted to open and close an opening according to weather conditions, with means for adjusting and retaining the cover or door in adjusted positions.

Other objects of the invention will appear from the following description taken in connection with the drawings, which form a part of this specification, and in which:

Fig. 1 is a side elevation of the front portion of a motor vehicle partly broken away, illustrating a hood equipped with the invention;

Fig. 2 is an enlarged cross-sectional view taken on line 2—2 of Fig. 1;

Fig. 3 is an enlarged rear elevation of one of the doors, a portion of the hood and the hinge upon which the door is mounted, the hinge being partly broken away;

Fig. 4 is an enlarged detailed view in section illustrating the position of the hinge members when the door is open, and Fig. 5 is a vertical sectional view through the hinge.

Referring to the drawings, at 10 is illustrated a portion of a side member of the chassis frame of a motor vehicle. It will, of course, be understood that there are two side members, one arranged on each side of the vehicle. A body of any conventional type having a cowl 11 is supported by the side members and secured thereto in any convenient manner. Suitably spaced from the cowl on the forward end of the side members is a radiator 12, the space between the cowl and the radiator constituting an engine compartment. This compartment is covered by a hood 13 supported at one end by the cowl and at the other end by the radiator.

The hood is constructed of sheet metal sections 14 and 15 suitably joined as by piano hinges 16 so that the sections may be raised and folded to give access to the engine compartment in a manner well understood in this art. The side sections 15 are preferably provided with raised panels 17, having arranged therein longitudinally a plurality of equally spaced, rectangular, parallel openings 18. These openings are adapted to take the place of louvers which are generally arranged in the side sections of an engine hood and perform the same function, but owing to the size thereof, allow a better circulation of air through the engine compartment.

It is desirable that the openings 18 which are for ventilating purposes may be opened and closed as weather conditions demand, and it is also desirable that when the openings are closed they shall be effectively sealed against both air and water. To accomplish this end, each opening 18 has its edge turned inwardly and outwardly to provide a groove or channel 19 around the opening and a door or cover 20 is provided for the opening, the door being equipped or formed with a peripheral flange 21 adapted to extend into and to be seated in the groove 19 and firmly held against its seat in a manner to be hereinafter explained.

Secured to the back of the door or cover 20 preferably by spot-welding is a hinge member 22, the body of which is arcuate and is provided with side flanges 23 which lend great strength and rigidity thereto. The hinge member 22 is secured by one end to the door or cover, the end being flattened and spot-welded to the body of the door. The hinge member 22 is provided at its other end in the flanges 23 with oppositely disposed apertures for the reception of a pintle 24. Spot-welded or otherwise secured to the back of the panel 17 adjacent to the grooved or channeled edge 21 is a hinge member 25 having oppositely disposed flanges 26 normal to the body portion and apertured to receive the pintle 24. A coiled spring 27 is mounted upon the pintle 24. As shown, the spring 27 is sectionalized and is provided with a central connecting loop attached to the hinge member 22, the ends of the spring bearing against the back of the panel 17, thus the action of the spring retains the door or cover normally in a closed position. Owing to the particular construction of the hinge member 22 the door or cover when opened will swing free and clear of the groove 19 and that portion of the panel immediately surrounding the same, thus avoiding scarring or other injury to the panel by contact therewith. Then too, the structure permits of a more satisfactory sealing of the door or cover in the groove 19, since it will produce a more uniform pressure of the door than could possibly be attained in any structure wherein the door is hinged by one edge thereof.

A stop mechanism is arranged between the hinge members 22 and 25. As shown, the stop mechanism comprises parallel arcuate guides 28 bent up from the hinge member 25 and provided with oppositely disposed notches 29 and beveled end portions 30, the object of which will hereinafter appear. A yoke member 31 is mounted upon the hinge member 22 between the guides 28 with its arms 32 adjacent the guides. The arms 32 act as a stop to limit the opening movement of the door or cover by engaging the back of the panel 17 and also serve to support a tubular member 33 in which is mounted a coiled spring 34 having seated upon each end thereof a ball 35, with segments of the balls protruding through openings in the arms 32 of the yoke to engage the guides 28, the notches 29 and the beveled portions 30.

The tension of the spring 34 is sufficient to offset the tension of the sectionalized spring 27. Accordingly when the door or cover is opened by the knob 36 against the action of the spring 27 which normally holds the door in a closed position, the balls 35 travel along the guides 28 and are brought into engagement with the notches 29 in which they are pressed by the spring 34 and serve to retain the door in an opened position. It will, of course, be understood that a plurality of the notches 29 may be employed to hold or sustain the door in different positions. When the door or cover is in a closed position the balls 35 bear upon the beveled ends 30, in which position the tension of the spring 34 is added to the tension of the spring 27 to maintain the door in a closed position, hence, there is a double force acting to maintain the door or cover in a closed position which insures the seating of the peripheral flange upon the door in the groove around the opening with sufficient pressure thereon to prevent vibration and the obnoxious noises incident thereto.

While I have shown and described the preferred embodiment of my invention, I wish it to be understood that I do not confine myself to the precise details of the construction herein set forth, by way of illustration, as it is apparent that many changes and variations may be made therein, by those skilled in the art, without departing from the spirit of the invention, or exceeding the scope of the appended claims.

Having thus described my invention, what I claim and desire to secure by Letters Patent is:

1. In a ventilator, a panel having an opening, a cover for the opening, a hinge for the cover, guides upon one leaf of the hinge, a stop upon the other leaf of the hinge intermediate the guides and retaining means between the stop and the guides.

2. In a ventilator, a panel having an opening, a cover for the opening, a spring pressed hinge for the cover, guides upon one leaf of the hinge having oppositely disposed notches, a stop upon the other leaf of the hinge intermediate the guides and spring actuated members carried by the stop and adapted to engage the notches in the guides.

3. In a ventilator, a member having an opening therein, a cover for the opening, a spring and spring pressed means extending parallel to the cover for closing the cover and a second spring and a second spring pressed means extending in a direction parallel to the cover closing spring for retaining the cover in an open position.

4. In a ventilator, a panel having an opening, a cover for the opening, a spring pressed hinge for the cover, members on one leaf of the hinge having notches and beveled end portions, a stop on the other leaf of the hinge intermediate the members and spring pressed members on the stop adapted to engage the notches to retain the cover in an open position and to engage the beveled end portions when the cover is in a closed position.

5. In a ventilator a member having an opening therein, a cover for the opening, a spring and spring pressed means for closing the cover, a notched guide, and a second spring pressed means extending in a direction parallel to the cover closing spring and adapted to coact with means on the guide for retaining the cover in an open position against the action of the cover closing spring and for yieldably assisting the cover closing means to hold the cover in the closed position.

6. In a ventilator, a member having an opening therein, a cover for the opening, a hinge for the cover comprising a pintle, a flanged hinge leaf to engage the pintle having in addition a plurality of arcuate guides, and another hinge leaf of arcuate shape provided with an inwardly extending yoke member and spring pressed means on the yoke member for engaging the arcuate guides of the first hinge leaf.

7. In a ventilator a member having an opening therein, a cover for the opening, a hinge for the cover comprising a pintle, a flanged hinge leaf to engage the pintle fastened to the first named member and a second hinge leaf arcuate in section having inwardly turned edges to engage the pintle, to constitute a stiffening means for the hinge, and to protect the hinge mechanism.

8. In a ventilator, a member having an opening therein, a cover for the opening, a hinge for the cover comprising a pintle, a hinge leaf provided with means to engage the pintle fastened to the first named member, notched arcuate guides bent up from the hinge leaf, a second hinge leaf of arcuate shape having flanged sides provided with openings for engaging the pintle, a yoke member fastened to the inside of the second hinge leaf having oppositely disposed openings therein, a spring within the bracket and balls in the oppositely disposed openings for engaging the notched arcuate guides.

In testimony whereof I affix my signature.

HARRY C. ELLIOTT.